C. G. COOPER.
BEET HARVESTER.
APPLICATION FILED FEB. 1, 1913.
1,088,260.
Patented Feb. 24, 1914.
3 SHEETS—SHEET 2.
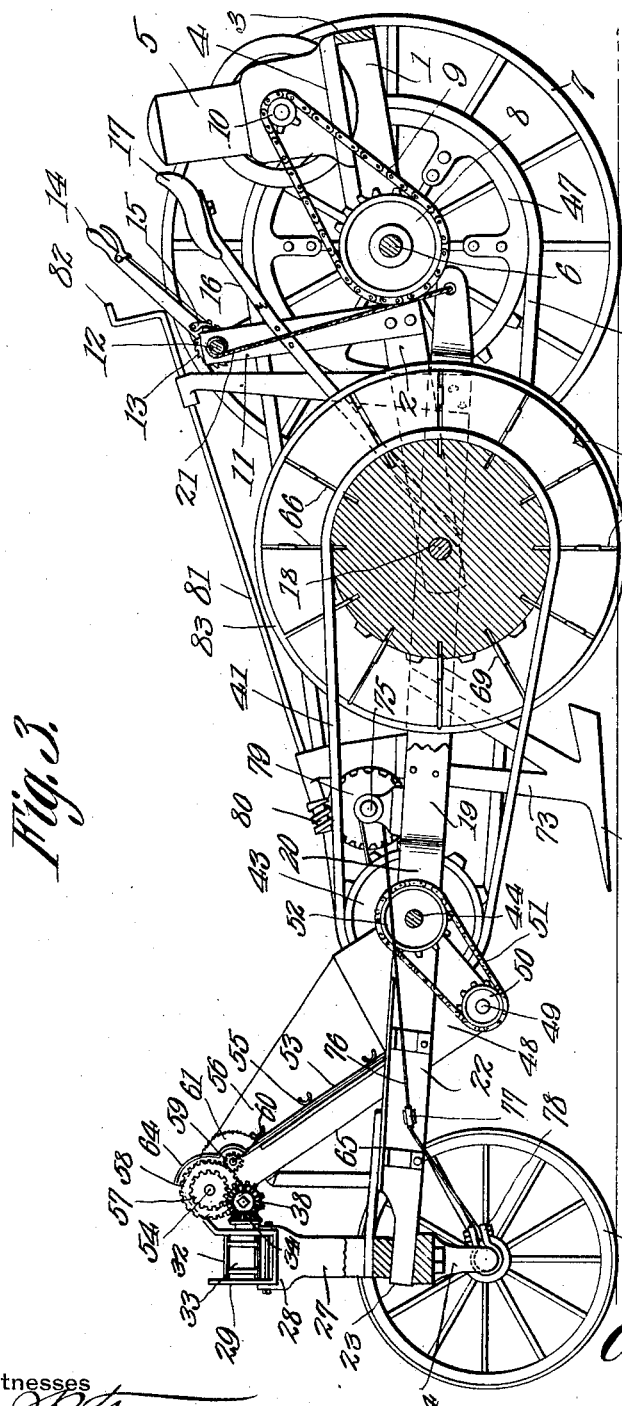
Charles G. Cooper
Inventor,
by C. A. Snow & Co.
Attorneys.
Witnesses

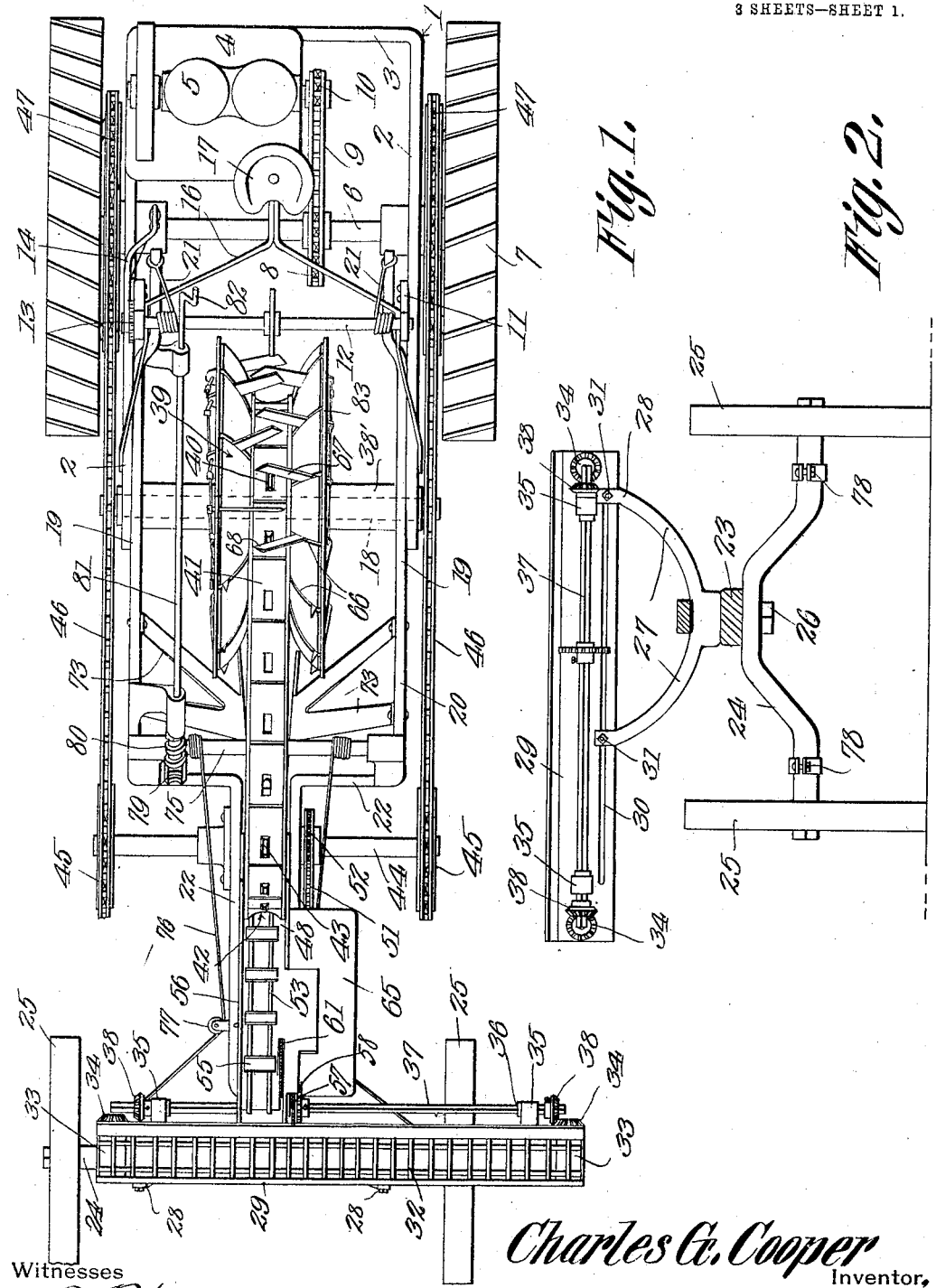

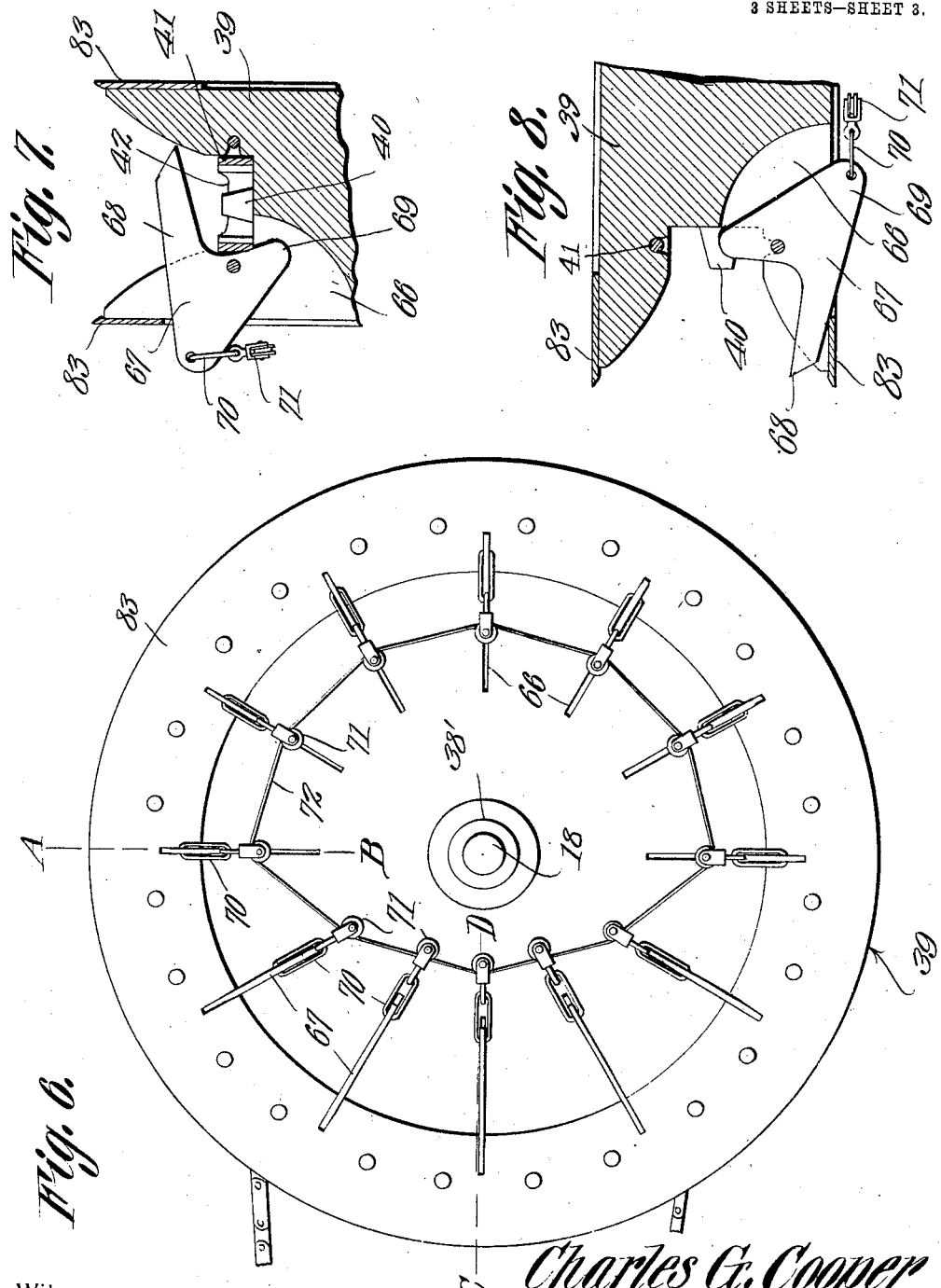

UNITED STATES PATENT OFFICE.

CHARLES G. COOPER, OF YUMA, ARIZONA, ASSIGNOR OF ONE-HALF TO SAMUEL L. KELLY, OF YUMA, ARIZONA.

BEET-HARVESTER.

1,088,260.

Specification of Letters Patent.   Patented Feb. 24, 1914.

Application filed February 1, 1913. Serial No. 745,752.

*To all whom it may concern:*

Be it known that I, CHARLES G. COOPER, a citizen of the United States, residing at Yuma, in the county of Yuma and State of Arizona, have invented a new and useful Beet-Harvester, of which the following is a specification.

This invention relates to machines for harvesting beets, one of its objects being to provide novel means for engaging the beets as soon as they are loosened from the soil and elevating them to a conveyer which, in turn, directs the beets to a point from which they can be readily directed to cutting mechanism designed to remove the tops.

A further object is to provide a rotary elevator which receives its motion from a combined drive chain and conveyer, the said chain constituting means for controlling the action of the beet gripping elements carried by the rotary elevator.

Another object is to provide a machine of this character the beet engaging and digging means of which can be readily adjusted vertically.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the complete machine. Fig. 2 is a rear elevation of the front axle, the yoke thereon, and the conveyer structure mounted on the yoke, the tongue at the front end of the main frame being shown in section. Fig. 3 is a vertical longitudinal section through the machine. Fig. 4 is an enlarged section through the delivery conveyer and showing the gearing employed for driving the rotary saw and the conveyer shaft, the saw and gears being shown in elevation. Fig. 5 is a rear elevation of the parts shown in Fig. 4. Fig. 6 is an enlarged side elevation of the elevating wheel. Fig. 7 is a section on line A—B Fig. 6. Fig. 8 is a section on line C—D Fig. 6.

Referring to the figures by characters of reference 1 designates the rear section of the main frame, the frame consisting of side beams 2 and a rear cross beam 3, there being a platform 4 mounted on the section 1 and supporting a motor 5. The side beams are mounted, at intermediate points, upon the revoluble rear axle 6 of the machine, there being supporting wheels 7 secured to this axle. A sprocket 8 is secured to axle 6 and receives motion, through a chain 9, from a sprocket 10 driven by the motor 5. Standards 11 are mounted on the side beams 2 and support a shaft 12 having a ratchet wheel 13 secured to one end portion thereof. A lever 14 is loosely mounted on the shaft and carries a pawl 15 adapted to engage the ratchet wheel and whereby, during the oscillation of the lever 14, said ratchet wheel will be rotated intermittently in one direction.

Rearwardly converging supports 16 are secured to the standards 11 and to the side beams 2 and carry a seat 17 to be occupied by the person controlling the operation of the machine.

A shaft 18 extends transversely of the frame section 1 and connects the front end portions of the side beams 2. This shaft likewise extends through the side beams 19 of the front frame section 20, said side beams being extended both forwardly and rearwardly from the shaft 18. The rear ends of the side beams 19 are connected by cables 21 or other suitable flexible elements, to the shaft 12 and it is to be understood that when said shaft is rotated in one direction, these connections will be wound thereon whereas, when the shaft is rotated in the opposite direction, the connections will be unwound. The front ends of the beams 19 merge into forwardly extending L-shaped beams 22, the front ends of which are secured to or formed with a tongue 23. This tongue bears downwardly on the middle portion of an arched front axle 24 which is supported by wheels 25. The tongue and axle are pivotally connected and a king bolt 26 extends upwardly through a yoke 27 the upper terminals of which are forked, as indicated at 28. Slidably mounted in these forked terminals is an elongated trough 29 preferably adjustable longitudinally within the forks. As shown in Figs. 2 and 4, the front and back walls of the trough 29 are provided with longitudinal slots 30 and clamping bolts 31 may be extended through these slots and through the forks of the yoke 27. By tightening these bolts the trough can be held against longitudinal movement. When, however, the bolts are loosened, the trough can be shifted longitudinally so as to project beyond either side of the machine.

An endless conveyer 32 is mounted in the trough and is supported within the end portion of the trough, by rollers 33, each of which has a gear 34 revoluble therewith. Brackets 35 are mounted upon the rear wall of the trough and sleeves 36 are mounted to rotate in these brackets. An angular shaft 37 is slidably mounted in the sleeves and is provided, at each end, with a gear 38. When shaft 37 is shifted in one direction relative to the trough 29, the gears 34 and 38 at one side of the machine are brought into mesh and, when shaft 37 is shifted in the opposite direction relative to the trough, the other two gears 34 and 38 are brought into mesh. Thus it will be seen that the direction of movement of the conveyer 32 can be controlled.

It is to be understood that the shaft 18 constitutes the pivotal connection between the two sections 1 and 20 of the main frame. This shaft likewise constitutes the support for an elevating wheel of novel form. This wheel is held spaced from the side beams 19 by sleeves 38' and has been designated generally at 39. The wheel is substantially spool-shaped and is provided, at the center of its periphery, with an annular series of sprocket teeth 40 adapted to engage an endless chain 41, the outer faces of the links of which are concaved transversely, as shown at 42. This chain 41 extends forwardly within the frame section 20 and engages a centrally disposed sprocket 43 secured to a transverse shaft 44 which is journaled in the beams 22 and extends laterally beyond the side beams 19. Sprockets 45 are secured to the end portions of shaft 44 and receive motion, through chains 46, from large sprockets 47 secured to the inner sides of the wheels 7. A hopper 48 is mounted between the beams 22 and the sprocket 43 projects into this hopper so that any material conveyed by the upper flight of the chain conveyer 41 will be deposited into the hopper.

A transverse shaft 49 is journaled in the bottom portion of the hopper and receives motion through a sprocket 50 and a chain 51 from a sprocket 52 secured to the shaft 44. This shaft 49 drives an endless elevator 53 the upper portion of which is supported by a shaft 54, said shaft being driven by the elevator. Clips 55 are carried by the elevator and extend transversely thereof. The elevator is mounted within an upwardly inclined trough 56 whereby lateral displacement of material from the elevator is prevented.

Gears 57 and 58 rotate with the shaft 54 and the larger gear 58 meshes with a smaller gear 59 which is secured to a shaft 60. A saw 61 is likewise secured to this shaft and is located close to one side of the elevator 53. Gear 57 meshes with another gear 62 which is mounted on the angular shaft 37 and is held against displacement relative thereto by means of a set screw 63 or the like. A guard 64 may be extended over the gears so as to protect persons working adjacent thereto and a platform 65 is preferably extended laterally from one of the beams 22 and close to the elevator, so that two operators may stand thereon, one of them placing the beets quickly in the clips 55 and with their tops extending toward the platform while the other operator adjusts the beets in the clips so that the saw will cut off the tops close to the beets.

The sides of the annular groove or channel formed in the elevating wheel 39 preferably diverge outwardly, as shown particularly in Figs. 1, 7 and 8 and radial slots 66 are formed in the two sides, the slots in each side of the wheel being staggered with relation to the slots in the other side thereof. Each slot extends past the annular series of teeth 40 toward the center of the wheel and likewise extends inwardly close to the sprocket teeth so that, during the rotation of the wheel, portions of the slots 66 will be successively lapped by the chain 41. This arrangement of the slots with relation to the sprocket teeth 40 will be clearly apparent by referring to Figs. 7 and 8 of the drawings.

Pivotally mounted within each slot 66 is a gripping dog 67 having an arm 68 adapted either to extend across the annular channel in the wheel so as to overhang a portion of the chain 41, as shown in Fig. 7, or else to extend outwardly within the slot 66 and at one side of the path of the chain, as shown in Fig. 8. A tongue 69 extends from the dog and adjacent the arm 68, this tongue being adapted to extend under the chain 41 when arm 68 is extended transversely of the wheel and to extend into the path of the chain when the arm 68 is extended radially. The outer end portion of the dog 67 constantly projects beyond one side of the wheel 39 and is engaged by a link 70 which, in turn, is connected to a pulley 71. The pulleys at each side of the wheel are all engaged by a single endless flexible element 72 so proportioned as to pull inwardly on the pulleys 71 of those dogs which are free of the chain 41, thereby to hold the arms 68 of said dogs extended radially, as shown at the left of Fig. 6 and as likewise shown in Fig. 8.

Standards 73 extend downwardly from the side beams 19 to points in front of the elevating wheel 39 and are provided at their lower ends with digging plows 74.

A shaft 75 extends transversely of and is journaled upon the front section 20 of the main frame and secured to opposite end portions of this shaft are steering cables 76 which are guided around pulleys 77 and are connected to opposite end portions of the arched axle 24, as indicated at 78. A worm wheel 79 is secured to the shaft 75 and is engaged by a worm 80 carried by the front end of a rearwardly and upwardly inclined shaft 81. This shaft is provided, at its rear end, with a crank 82 or any other suitable means whereby it can be rotated readily. Thus it will be seen that the machine can be easily steered while moving forward.

For the purpose of cutting into the soil at opposite sides of a row of beets and thus severing weeds and other undesirable growths, rings 83 are attached to the sides of the wheel 39 and extend beyond the periphery thereof, the outer edges of these rings being sharpened so as to cut into the soil and sever any vegetation in the paths thereof.

It is to be understood of course that motion is transmitted to the drive wheels 7 through sprockets 8 and 10 and chain 9 and, at the same time, power is transmitted through chains 46, sprockets 47 and 45 to the shaft 44. Thus the conveyer chain 41 is actuated and serves to transmit motion to the elevating wheel 39. During the forward movement of the machine, the plows 74 dig up the beets and as the wheel 39 straddles the row, the beets will ultimately be engaged by the gripping arms 68 of the dogs 67. As the dogs move downwardly between the upper and lower flights of the chains 41, the arms 68 are disposed radially, as shown in Fig. 8. As the tongues 69 come successively into contact with the lower flight of the chain 41, the tongues are swung inwardly toward the center of the wheel and thus cause the arms 68 to swing toward the outer surface of the chain 42, thereby gripping the beets between the arm and the chain. The beets are thus carried upwardly during the further rotation of the wheel 39 and until they reach that point where the upper flight of the chain leaves the sprocket teeth. At this point the short flexible element 72 pulls upon the projecting portion of the dog 67 so as to cause the tongue 69 to press outwardly against the inner surface of the upper flight of the chain and, at the same time, cause the arms 68 to swing outwardly away from the chain. Thus the beet will be gradually released and, finally, will travel along the upper flight of the chain 41 until it is discharged into the hopper 48. As soon as it is discharged, one of the operators on the platform 65, places it in one of the clips 55 and, when the beet reaches the upper portion of the elevator, the second operator adjusts it within the clip so that the top of the beet will be severed close to the beet by the rotating saw 61. The beet will then be carried over the shaft 54 and dropped onto the conveyer 32 which will carry it beyond one side of the machine. It is to be understood of course that motion is transmitted to the conveyer through the gears 57 and 62 and thence through shaft 37 to the gears 38 and 34. When it is desired to discharge the beet from the left side of the machine, the bolts 31 are loosened, the conveyer trough 29 is shifted longitudinally within the forks 27 so as to extend beyond the left of the machine, the bolts 31 are then tightened, and the set screw 63 is loosened. Thus shaft 37 can be shifted longitudinally so as to bring the gear 38 at the left end thereof into mesh with the adjacent gear 34. After the set screw 63 has been tightened, it will be apparent that motion will be transmitted through the gears to shaft 37 so as to cause the conveyer to carry the beets to the left side of the machine. By repeating the foregoing operation and adjusting the elevator toward the right side of the machine and then shifting shaft 37 so as to bring the right-hand gear 38 into mesh with the adjacent gear 34, the conveyer will operate to carry the beets to the right side of the machine.

It will be apparent that by rotating shaft 12, in the manner hereinbefore described, the rear end portions of the side beams 19 can be elevated and, as the side beams are pivotally connected to the side beams 2 by means of the cross shaft 18, it will be seen that this adjustment of the side beams will result in the elevation of the rear end of frame section 20 and of the front end of frame section 1. Consequently the elevating wheel 39 and the plows 74 will be elevated out of engagement with the soil.

What is claimed is:—

1. In a beet harvester the combination with a digger, of a wheel mounted to straddle and travel along a row back of the digger, a combined drive chain and conveyer mounted upon said wheel, and elements pivoted to the peripheral portion of the wheel and movable in planes extending transversely through and readily of the wheel, said elements coöperating with the chain for gripping beets during their movement with the wheel from the lower to the upper flight of the chain.

2. A beet harvester including a digger, a wheel adapted to straddle a row back of the digger, an endless conveyer for rotating the wheel, elements pivoted to the peripheral portion of the wheel and including means adapted to be engaged and shifted by the conveyer to operate said elements to successively clamp beets upon the conveyer and hold them to that portion of the conveyer engaging the wheel, and means for automatically disengaging said clamping means from the beets while moving away from the wheel and upon the conveyer.

3. A beet harvester including a digger, an endless conveyer, a wheel adapted to straddle a row back of the digger and actuated by the conveyer, and opposed series of gripping elements carried by the wheel and disposed in staggered relation, said conveyer and elements coöperating to engage beets and convey them upwardly partly around the wheel, and means for automatically shifting said gripping elements out of engagement with the beets during the movement of the beets away from the wheel and with the conveyer, said means including an endless flexible element beyond one side of the wheel and means carried by the respective gripping elements for engaging said flexible element.

4. A beet harvester including a digger, a wheel back of the digger and adapted to straddle the row acted upon thereby, a combined drive element and conveyer engaging the wheel, means for actuating said element, opposed series of gripping devices within the sides of the wheel and disposed in staggered relation, means carried by said devices and adapted to be successively lapped by the conveyer for successively swinging the devices inwardly toward the axis of rotation of the wheel and into engagement with beets to clamp them upon that portion of the chain engaging the wheel, and means for successively disengaging said devices from the beets during the movement of the beets with the conveyer away from the wheel.

5. A beet harvester including a digger, a wheel back of the digger and adapted to straddle the row acted upon thereby, a combined drive element and conveyer engaging the wheel, means for actuating said element, gripping dogs pivotally mounted within the sides of the wheel, tongues movable with the dogs and coöperating with the conveyer for shifting said dogs into engagement with the beets to hold them upon that portion of the conveyer engaging the wheel, a flexible element revoluble with the wheel, and means carried by the dogs and engaging said element whereby the dogs are successively shifted out of engagement with the beets during the movement of said beets with the conveyer and away from the wheel.

6. A beet harvester including a wheel supported frame, a digger carried thereby, and an elevating wheel back of the digger adapted to straddle the row acted upon by the digger, a combined drive element and conveyer engaging the wheel, means carried by the wheel and coöperating with said conveyer for successively gripping beets and holding them to that portion of the conveyer engaging the wheel, means for successively disengaging said devices from the beets while moving with the conveyer away from the wheel, and cutting rings secured to the sides of the wheel for digging into the soil.

7. In a beet harvester, elevating and conveying means including a spool-like wheel adapted to straddle a row of beets, said wheel having radial slots in opposite sides thereof and disposed in staggered relation, sprocket teeth upon the middle portion of the wheel, a combined drive chain and conveyer engaging said teeth, dogs pivotally mounted within the slots, a tongue extending from each dog, that portion of the chain upon the wheel coöperating with the tongue to hold the dogs extended transversely of the wheel to grip beets upon the chain, and a flexible connection between the dogs for automatically shifting the dogs successively out of the path of the chain while the dogs are passing from the lower to the upper flights of the chain.

In testimony that I claim the foregoing as my own, I have hereto affixed my signature in the presence of two witnesses.

CHARLES G. COOPER.

Witnesses:
  SAMUEL L. KELLY,
  HENRY WUPPERMAN.

---

Copies of this patent may be obtained for five cents each, by addressing the "Commissioner of Patents, Washington, D. C."